United States Patent [19]

Salce, Sr.

[11] Patent Number: 4,926,699

[45] Date of Patent: May 22, 1990

[54] TORQUE TOOL

[75] Inventor: Luigi C. Salce, Sr., Quinebaug, Conn.

[73] Assignee: Advance Manufacturing Co., Inc., Westfield, Mass.

[21] Appl. No.: 332,877

[22] Filed: Apr. 3, 1989

[51] Int. Cl.$^5$ .................. B25B 23/14; B23P 19/06
[52] U.S. Cl. .................................. 73/862.21; 29/813; 81/57.37
[58] Field of Search ............... 73/862.21, 862.23, 761; 81/467; 429, 57.25, 57.37; 29/813

[56] References Cited

U.S. PATENT DOCUMENTS

| | | | |
|---|---|---|---|
| 2,978,936 | 4/1961 | Orner | 81/429 X |
| 3,354,705 | 11/1967 | Dyer, Jr. | 73/761 |
| 3,541,900 | 11/1970 | Mosier | 81/57.23 |
| 4,487,093 | 12/1984 | Peroutky | 81/57.37 |

Primary Examiner—Charles A. Ruehl
Attorney, Agent, or Firm—Fishman, Dionne & Cantor

[57] ABSTRACT

A device for torquing and untorquing visable or hidden nuts or both disposed on a common circle of centers in the rotor assembly of a jet engine wherein said device comprises a bolt locating platform disposed outside of said rotor assembly, a trunnion assembly rotatably disposed within said rotor assembly, a connector between said platform and said trunnion assembly, a torquing assembly disposed on said platform and extending through and beyond said trunnion assembly, a torque box having a nut socket disposed thereon, said torque box being operably connected to said torquing assembly, a nut inserter assembly for transferring a nut from outside of said rotor assembly to a point within said assembly where said nut is transferred to the nut socket on said torque box and ultimately to a bolt within said rotor assembly and means operably connected to said device for monitoring and measuring the following parameters: bolt location, prevailing torque, applied torque, applied turn angle and/or breakaway torque.

12 Claims, 6 Drawing Sheets

TORQUE TOOL

BACKGROUND OF THE INVENTION

This invention relates to a device torquing or untorquing, in any sequence, visible or hidden nuts disposed on a common circle of centers. In particular, it relates to a torquing system and device capable of monitoring and measuring the following engineering parameters:
  (a) Bolt location
  (b) Prevailing torque of nut to bolt
  (c) Applied torque
  (d) Applied turn angle
  (e) Breakaway torque
When coupled to a computer which is software driven with exact torquing requirements, said system and device will monitor the torquing requirements without human interpretation.

In the manufacture and/or assembly of various complex mechanical devices such as jet engines and the like, it is often necessary to assemble parts together by the use of bolts and nuts which must be torqued to exacting specifications. In addition, the problem is often made more complex by the number of bolts and nuts to be torqued and the blind location of said bolts and nuts.

In the past, hidden or remotely positioned nuts and bolts were fastened together inaccurately by elaborate mechanical linkages with gearbox and/or power transmission extensions which produced incalculable results in the torque applied at the nut. Input to output errors were also introduced due to linkage vector and gearing losses. In such situations, damage to the nut and/or bolt was realized because of improper positioning of the torque applying device primarily due to a blind location or a remotely situated combination of nuts and bolts. Cross-threading of nuts to bolts was also realized due to an inability to accurately position and install a nut to a bolt at said remote or blind location. In addition, the corners of nuts may be damaged and the threads of bolts stripped because of an inability to accurately measure the output torques in relation to the input torques or to measure the preferred turn angle torque due to gearing or linkage backlash.

Further, in a repetitive or sequential type of torquing requirement requiring controlled duplicated results at each bolt site, torquing accuracy becomes questionable because of the above-noted losses and an inability to reposition the mechanical linkage in the same way at different locations. This problem is easily understood by those skilled in the art with reference to the assembly of a jet engine which may require a definite "pattern" torquing sequence of sometimes in excess of 100 nuts and bolts arranged in a circular pattern.

While many bolt and nut fastening applications are blind and/or remotely located, many are also located in confined areas which precludes the use of standard geared or linkage type torquing devices. In the past, said standard devices were incapable of applying a required torque in a confined area due to the contact ratios or the gearing required to operate in said confined areas. In these situations, the use of small diameter gears with a small number of teeth causes the tips of the gear teeth to dig into the radial flank of the pinion, thus causing tooth breakage and poor efficiency and thereby eliminating many torquing applications on particular size bolts in confined areas.

SUMMARY OF THE INVENTION

The present invention provides means for accurately installing nuts on bolts for torquing in remote and/or blind and/or confined areas without concern for losing the nut or misaligning the nut to the bolt. It also provides means for sensing, measuring and applying torque to a nut and bolt whereby the prevailing torque, the applied torque, the applied turn angle and the breakaway torque are monitored.

In view of the above, it is a principal object of the present invention to provide a torque tool for torquing and untorquing nuts and bolts located in remote and/or blind and/or confined areas.

It is another object of the present invention to provide a torque tool which will provide accurate and consistent torquing of nuts and bolts in a "pattern" type sequence.

It is another object of the present invention to provide a torque tool with a nut locating device for positioning nuts on bolts without misalignment and in a required sequence.

It is a further object of the present invention to provide a torque tool with sensing means for monitoring prevailing torque of a nut to a bolt, applied torque, applied turn angle and breakaway torque.

It is a still further object of the present invention to provide a torque tool which when coupled to a computer will monitor torquing requirements without human interpretation.

The foregoing and other objects and advantages of the present invention will become more apparent when considered in view of the following detailed description and accompanying drawings.

Figure 1:
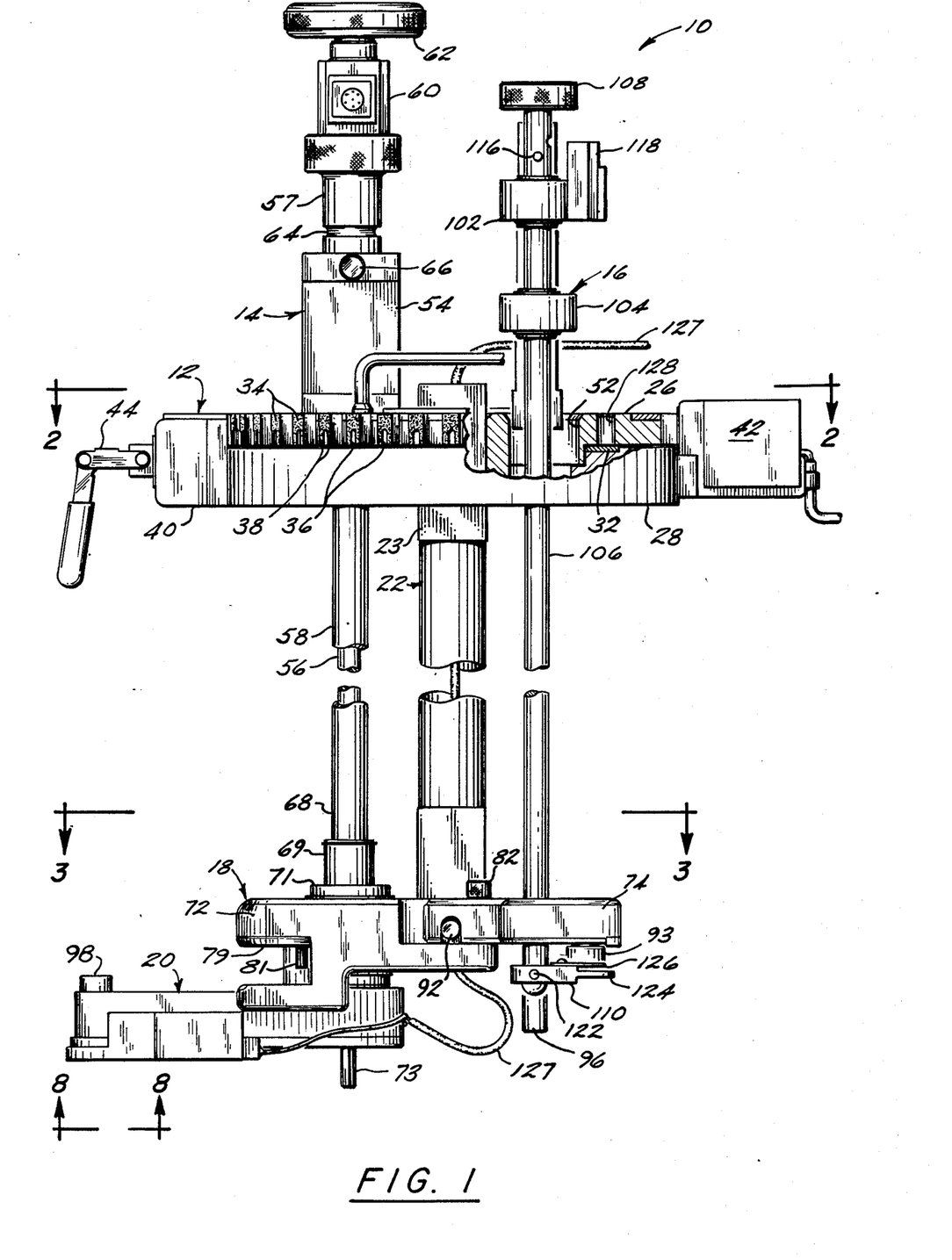
FIG. 1 is a front elevation view of the torque tool of the present invention.

With reference to FIG. 1, the torque tool of the present invention is indicated as numeral 10. As shown, the tool 10 is comprised of a bolt locating platform 12, a torque extension assembly 14, a nut inserter assembly 16, a trunnion assembly 18, a torque box 20 and a connector 22.

Figure 6:
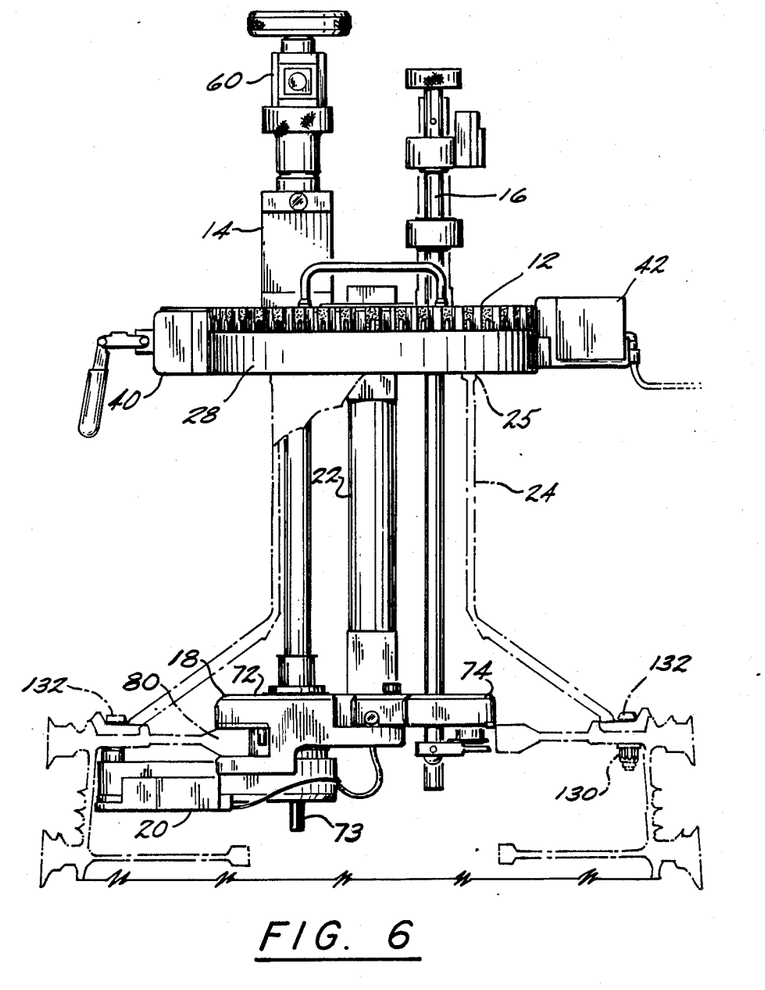
FIG. 6 is an elevation view of the torque tool of the present invention showing it in position in a jet engine.

As best seen in FIG. 6, the torque tool 10 is employed in conjunction with a jet engine rotor assembly shown in phantom at 24. As shown, the bolt locating platform 12 is positioned on the outer hub 25 shown in phantom in FIG. 7 of the rotor assembly 24 and the trunnion assembly 18 and torque box 20 are disposed within the assembly 24. Said platform 12 and combined trunnion assembly 18 and torque box 20 are connected and held in a predetermined relationship to one another by the connector 22. The torque extension assembly 14 and the nut inserter assembly 16 are disposed on the top surface of the platform 12 and are movable axially and rotatively relative thereto as will be more fully explained below.

Figure 2:
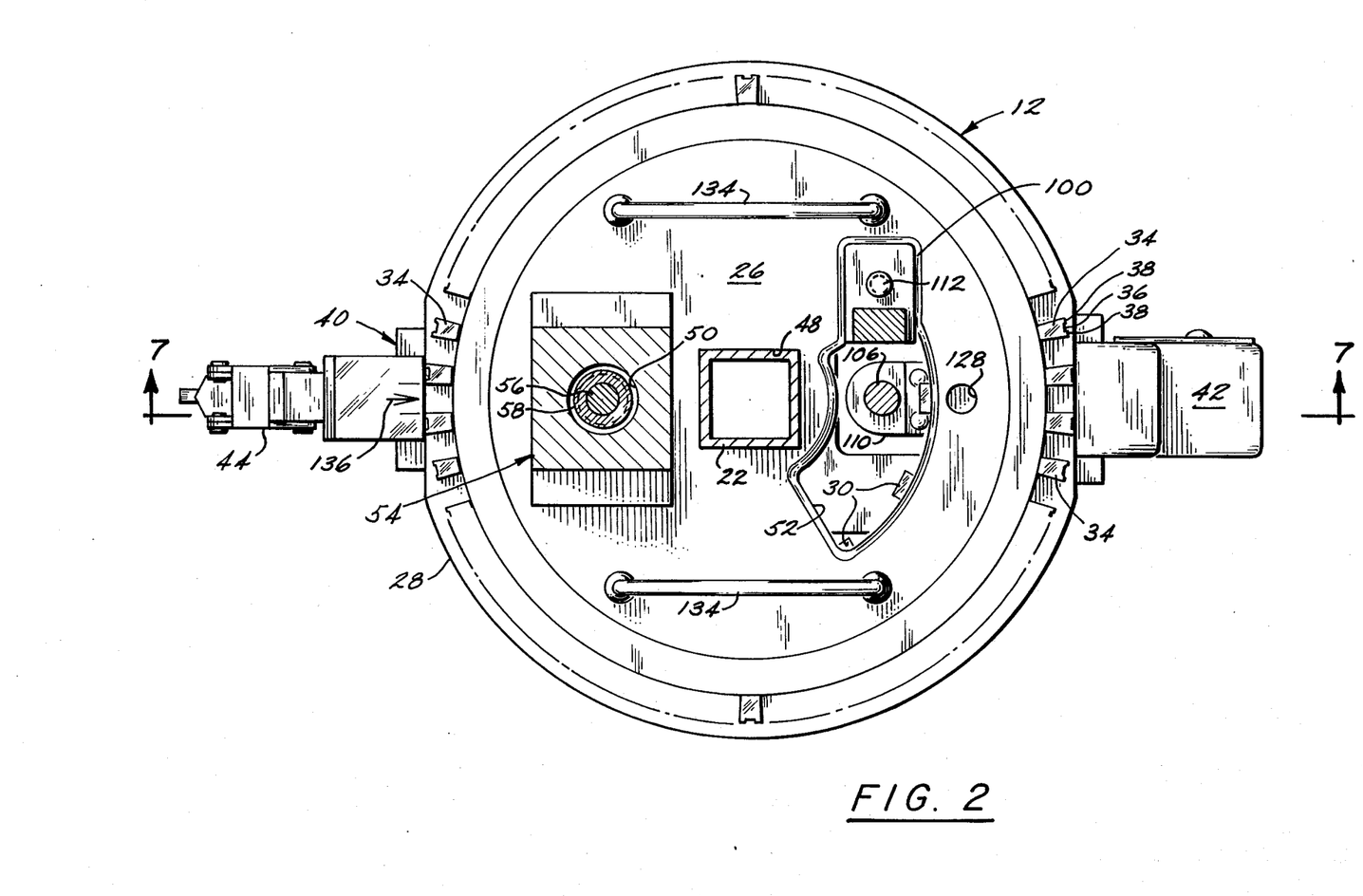
FIG. 2 is a section view taken along the line 2—2 of FIG. 1.
Figure 7:
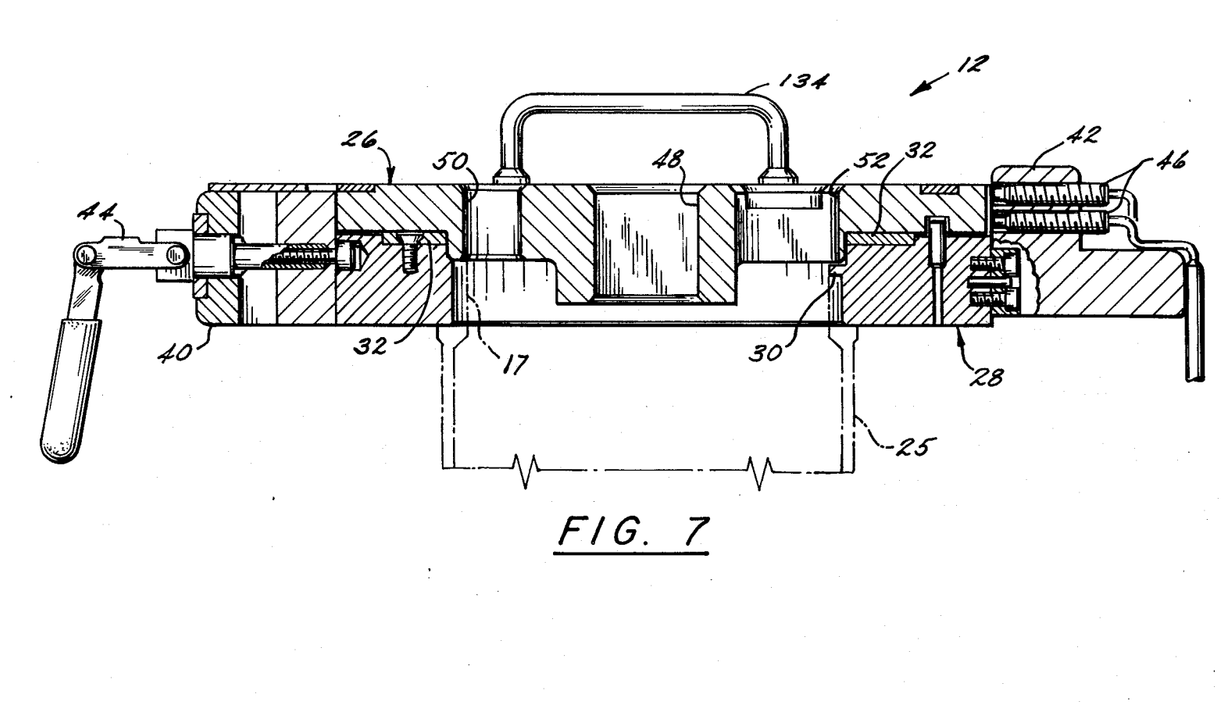
FIG. 7 is a section view taken along the line 7—7 of FIG. 2.

With reference to FIGS. 1, 2 and 7, it will be seen that the bolt locating platform 12 comprises a rotatable member 26 and a stationary member 28. The stationary member 28 is held in place on the top of the engine hub 17 by a plurality of ears 30 which are set into slots (not shown) in the top of said engine hub 25. The rotatable member 26 is located on top of the stationary member 28 and rotated against bearings 32. As best seen in FIG. 2, the upper outer edge of the rotatable member 26 is provided with a plurality of bolt locators 34 which are equally spaced about the circumference of said member 26. As shown in FIGS. 1, 2 and 6, each bolt locator 34 is provided with a vertical slot 36 which is coated with a reflective substance so as to provide each bolt locator 34 with a reflective surface, i.e. slot 36 flanked by non-reflective surface 38. The number of bolt locators 34 and therefore the number of slots represents the number of bolts in any selected torquing pattern or sequence and the spacing of the slots 36 represents the angular or linear placement of the bolts to be torqued.

With reference to FIGS. 2 and 7, it will be seen that the stationary member 28 is also provided with clamping means 40 and scanning means 42 affixed thereto. The clamping means 40 comprises a hand operated toggle-type clamp 44 which clamp locks the stationary member 28 to the rotatable member 26 and thereby locks in the angular position of the gearbox or torque box 20 relative to a bolt to be torqued. The scanning means comprises a plurality of optical scanners 46 which are positioned opposite the vertical edge of the rotating member 26 so as to be able to sense the reflective surfaces of slots 36 and the non-reflective surfaces 38.

With reference primarily to FIG. 2, it will be seen that the rotatable member 26 of the platform 12 is also provided with a plurality of apertures or cutouts. The first aperture 48 is disposed at the center of the member 26 and has a square configuration for receiving and holding the outer end of the connector 22. A second aperture 50 is radially offset from the first aperture 48 and is employed to slidably receive the torque extension assembly 14. The third aperture 52 is in fact a cutout in the shape of a truncated quadrant. Said third aperture 52 is adapted to permit vertical movement of the nut inserter assembly 16 from a position above the platform 12 to a position below said platform 12 as will be explained below.

Referring primarily to FIGS. 1 and 6, it will be seen that the torque extension assembly 14 extends from a position above the bolt locating platform 12 to a point wherein it is operative connected to the trunnion assembly 18 and the gear box 20.

The extension assembly 14 comprises a housing 54 disposed on and affixed to the top of the rotatable member 26 of the bolt locating platform 12. As further shown, a torquing shaft 56 is rotatably disposed within a counter-torque shaft 58 which is disposed for vertical movement as well as rotatable movement in said housing 54. A torsion cell 60 is affixed to the outer end of the torquing shaft 56 and a hand knob 62 is operably connected to said torsion cell 60 so that torque applied thereto is transmitted through the torsion cell 60 to the torquing shaft 56. Said counter-torque shaft 58 is provided with means for rotating same such as knob 57 which is affixed to the outer end of said shaft 58. As further shown, the counter-torque shaft 58 with the shaft 56 disposed therein is biased in an upwardly or outwardly direction by biasing means (not shown) disposed within the housing 54. The counter-torque shaft 58 and the torque shaft 56 may be moved vertically inwardly against the force of said biasing means and held in said displaced position by the mating of groove 64 disposed about the circumference of knob 57 and detent means 66 disposed in said housing 54.

Referring to FIG. 1, the lower end 68 of the counter-torque shaft 58 is threaded (not shown) and fastened to journal 69 affixed to the gear box 20. This journal 69 passes through a linear rotary bearing 71 which is housed in the left support 72 of the trunnion assembly 18. This arrangement makes the trunnion assembly 18 and the gear box 20 operably connected to the rotatable member 26. Torque shaft 56 is disposed within counter-torque shaft 58 and is provided with a male square 73 at its lower end. The male square 73 engages a female drive square (not shown) in the gear box 20 positioned below and not attached to journal 69. Thus means is provided for transferring the torque applied at knob 62 through the gear train of the gear box 20 to the socket 98.

Figures 3, 8:
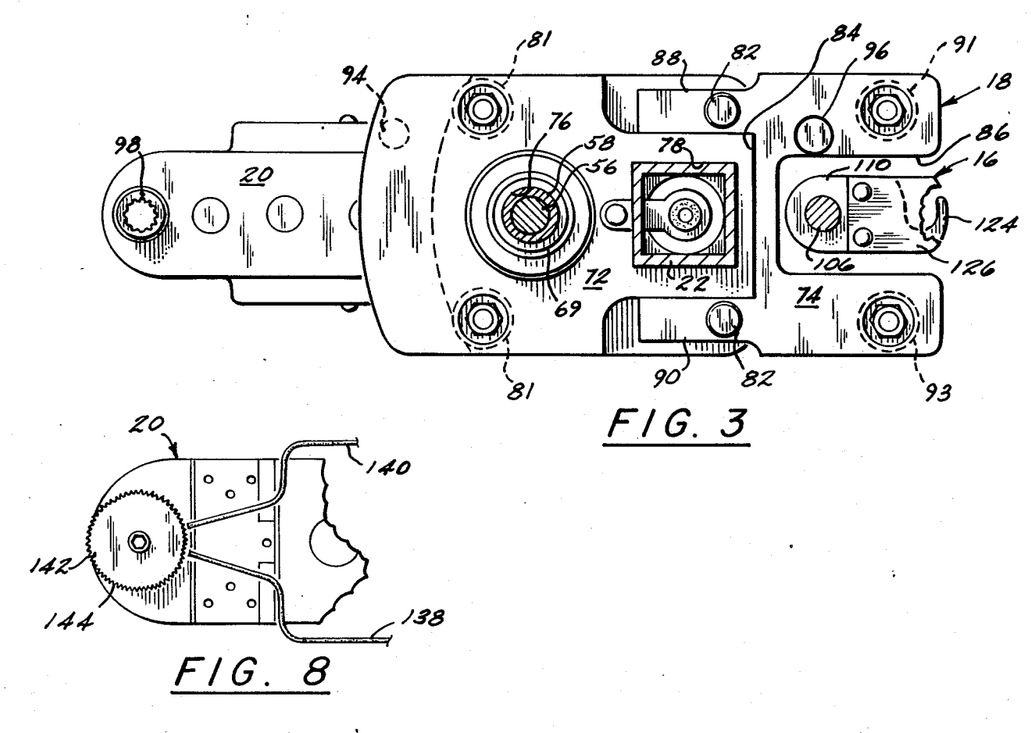
FIG. 3 is a section view taken along the line 3—3 of FIG. 1.
FIG. 8 is a view taken along the line 8—8 of FIG. 1.

The trunnion assembly 18 is best seen in FIGS. 1, 3 and 6. Said trunnion assembly 18 is comprised of two main parts, a left support 72 and a right support 74. The left support 72 is provided with an aperture 76 for slidably receiving the counter-torque shaft 58 of the torque extension assembly 14. Said support 74 is also provided with a square-shaped aperture 78 for receiving and holding the inner end of connector 22. As also shown, the left support 72 has a U-shaped channel 79 disposed in the outer side thereof. Said channel 79 is provided with a plurality of rollers 81 which when said trunnion assembly 18 is positioned in the rotor assembly 24 provide a roller bearing contact with the rotor assembly disk hub 80 which is positioned within the U-shaped channel 79 as shown in FIG. 6. As further shown, the support 72 is positioned above the gear box 20.

As best seen in FIGS. 1, 3 and 6, the right support 74 is affixed to said left support 72 with bolts 82 or the like. Said right support has a first cut-out portion 84 on the inner edge thereof and a second cut-out portion 86 on the outer edge thereof. Said cut-out portion 84 provides a pair of legs 88 and 90 which straddle the mating portion of the left support 72 which houses the connector 22. Pins 92 are provided to locate the right support 74 in relations to the left support 72. A pair of rollers 91 and 93 are disposed on either side of the cutout portion 86. Said rollers 91 and 93 bear against the rotor assembly disk hub 80 when the trunnion assembly 18 is assembled in the rotor assembly 24. As shown, the cutout portion 86 and the inner diameter of the disk hub 80 provide an open passageway for the nut inserter assembly 16.

As mentioned above, the gear box 20 is disposed below the trunnion assembly 18. The inner end of said gear box 20 is affixed to the counter-torque shaft 58. Said contact between the inner end of the gear box 20 and the counter-torque shaft 58 permits the angular rotation of the gear box 20 from a first position where it interacts with the nut inserter assembly 16 to a second position where it is used to install or remove nuts from rotor assembly 24 as will be explained further below. The angular rotation of said gear box 20 is limited by a stop or pin 94 disposed on the underside of left support 72 shown in phantom in FIG. 3 and a similar stop or pin 96 disposed on the underside of right support 74.

The gear box 20 is provided with a plurality of gears (not shown) for transmitting torque from the torquing shaft 56 to a socket 98 disposed on a shaft (not shown) driven by the gears of the gear box 20.

Figure 4:
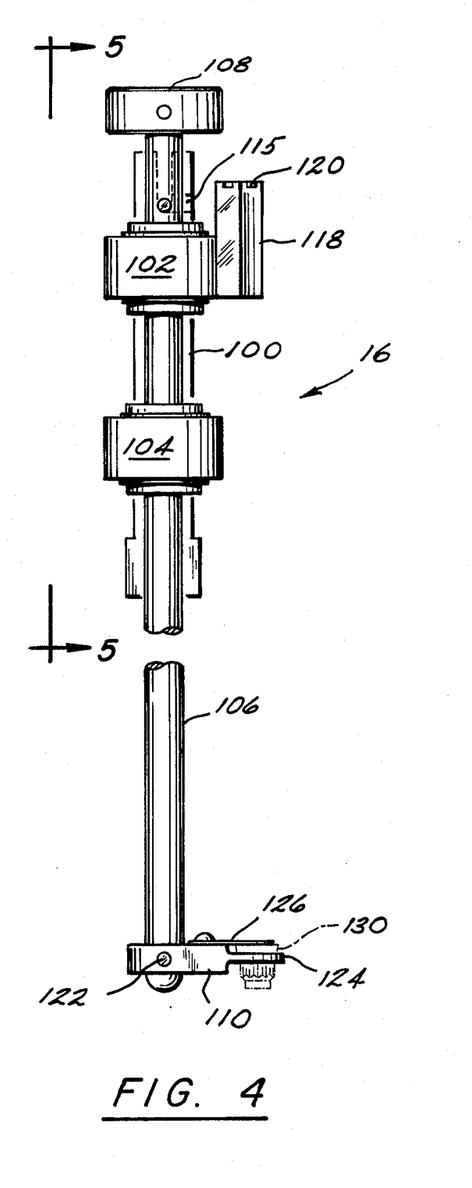
FIG. 4 is an enlarged front elevation view of the nut inserter assembly shown in FIG. 1.
Figure 5:
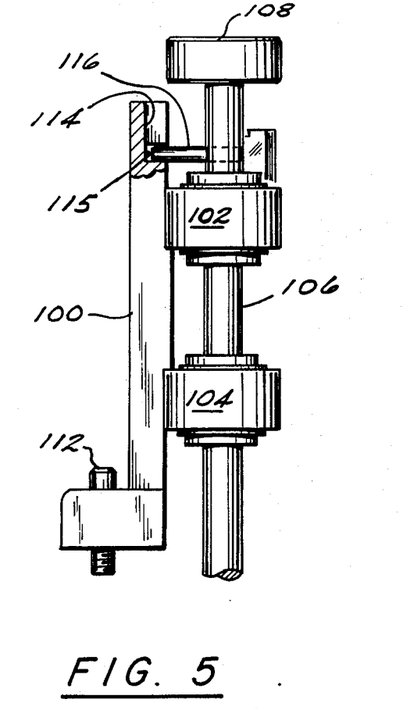
FIG. 5 is partial side view of said nut inserter assembly taken along the line 5—5 of FIG. 4.

With reference primarily to FIGS. 1, 4 and 5, it will be noted that the nut inserter assembly 16 is carried by the bolt locating platform 12 and comprises a mounting frame 100, a pair of linear rotary bearings 102 and 104 disposed in line on said frame, a shaft 106 supported by said bearings 102 and 104 for rotary and vertical movement relative thereto, a knob 108 at the outer end thereof, a nut loading/unloading arm 110 disposed at its inner end, and nut positioning means associated with said frame 100.

As shown, the mounting frame 100 is attached to the top surface of the platform 12 by bolt 112 in a position so that the shaft 106 with the arm 110 may be passed through the aperture 52 in said platform 12. As further shown, the nut positioning means includes a slot 114 in frame 100 which is for receiving the free end of pin 116 which extends outwards from the upper portion of shaft 106. A second slot 115 perpendicular to said slot 114 intersects said slot 114 at the bottom thereof. Said slot 115 allows pin 116 to be removed from slot 114 by rotational movement of shaft 106. As also shown, the upper linear rotary bearing 102 has a locator stop 118 affixed thereto. Said stop 118 is provided with a groove 120 which is engageable with the pin 116 as will be explained below.

The nut loading/unloading arm 110 has one end thereof attached to the shaft 106 by pin 122 or the like. Said arm 110 extends outwardly from said shaft 106, perpendicular thereto and terminates in a portion of reduced thickness 124 having a cutout therein in the shape of a crescent or "U" as shown in FIG. 3. A spring clip 126 is affixed to the upper side of said arm 110 and extends outwardly over said reduced thickness portion 124. As best seen in FIG. 4, the arm 110 is parallel to and offset 90° from the position of pin 116.

Installation and Operation

In order to operate the torque tool 10 of the present invention, it must first be installed in the compressor assembly 24 of a jet engine. With reference to FIGS. 1 and 6, the gear box 20 and the left support 72 of the trunnion assembly 18 are first lowered into the compressor assembly 24 and positioned therein so that the U-shaped channel 79 and the roller 81 therein engage the inside edge of rotor assembly disk hub 80. With said parts so positioned, the right support 74 of the trunnion assembly 18 is attached to the left support 72 so that the rollers 91 and 93 also contact the inner edge of the disk hub 80.

With the trunnion assembly 18 and the gear box 20 positioned as noted above, the inner end of the connector tube 22 is placed in contact with the trunnion assembly 18. At this point, the stationary member 28 of the platform 12 is seated upon the outer hub 25 of the rotor assembly 24. This is followed by inserting the upper square end 23 of the connector 22 into the aperture 48 in the rotatable member 26 of the platform 12. The rotatable member 26 is then lowered into contact with the stationary member 28 in a predetermined position required by the prepositioning of connector 22.

The torque extension assembly 14 is then inserted through second aperture 50 to a point where the torque shaft 56 and the counter-torque shaft 58 engage the trunnion assembly 18 and the gear box 20. When located as described, the assembly 14 is affixed to the rotatable member 26 of platform 12 via housing 54.

The nut inserter assembly 16 is also attached to the rotatable member 26 of platform 12 adjacent the third aperture 52 so that the nut loading/unloading arm 110 is movable from a position above said platform 12 to a position below said right support 74 of the trunnion assembly 18 and just above the socket 98 of the gear box 20.

As will be noted from the drawings, scanning means 42 and torsion cell 60 as well as sensor cable 127 which leads to gear box 20 are also positioned during installation of the tool 10.

With the torque tool 10 installed in the rotor assembly 24, nuts may be installed as follows:

To begin, the gear box 20 must be placed in a position where the socket 98 is visible directly beneath aperture 52. If the gear box 20 is not in this position, it may be moved there by rotating the counter-torque shaft 58. With the gear box 20 so positioned, the shaft 106 of the nut inserter assembly 16 is moved outwardly to a point where the nut loading/unloading arm 110 is positioned slightly above the top surface of platform 12. A nut 130 is positioned in the nut locator hole 128 and is captured by the slotted reduced section 124 and spring clip 126 by rotating knob 108 pinned to shaft 106. With the nut positioned in the nut loading/unloading arm 110, the unit is lowered to a position below the right support 74 of the trunnion assembly 18 where the socket 98 of gear box 20 is located. The actual position of the arm 110 is controlled by placing the pin 116 in the slot 114 of the mounting frame 100. Once the nut is nested in the gear box socket 98, the shaft 106 is rotated clockwise by turning knob 108 thus causing the pin 116 to exit slot 114 via slot 115. Once the pin 116 contacts the locator stop 118, the inserter assembly 16 is lifted slightly until the pin 116 can be seated in groove 120 of the stop 118 whereby the nut 130 is stripped from the arm 110 and is held in the socket 98.

With a nut 130 disposed in the gear box socket 98, the gear box 20 is rotated 180° so that it comes into contact with pin 94. In this position, the detent means 66 is disengaged from the groove 64 which permits the torque extension assembly 14 to move outwardly thus moving the gear box 20 to a position wherein the nut in the socket 98 is placed on the threads of a tie bolt 132.

The nut 130 is threaded onto the tie bolt 132 by rotating knob 62 clockwise. The nut 130 may be torqued to a predetermined force with the aid of the torsion cell 60.

Once the nut 130 has been applied to the tie bolt 132, the torque extension assembly 14 is pushed inwardly which in turn forces the socket 98 of the gear box 20 from the nut 130. The assembly 14 is once again held in this inward position by the action of detent means 66 in groove 64.

In order to install a second nut 130 on a second bolt 132, the clamp 44 on rotatable member 26 is released and said member 26 is rotated by turning same with handles 134 to a point where the locating arrow 136 is positioned opposite and pointing to a bolt locator 34 which corresponds to the second tie bolt 132. Once the second tie bolt position has been located, the clamp 44 is activated and the procedure for installing a nut 130 given above is repeated. This same procedure is repeated until all tie bolts 132 have had nuts 130 threaded onto them.

Monitoring Torquing Parameters

As mentioned above, the torque tool of the present invention is capable of monitoring the following engineering parameters: bolt location, prevailing torque, applied torque, applied turn angle and breakaway torque. The means employed for monitoring said parameters involves the use of optical scanners and a torsion cell operably connected to sensors which may be interpreted directly or by an appropriate computer program.

The bolt location aspect of the present invention previously referred to involves the relationship between bolt locators 34, the scanning means 42 and the locating indicia 136. As previously indicated, one bolt locator 34 is provided on the periphery of rotatable member 26 for each bolt 132 to which a nut 130 is to be applied. As should be noted, the position of a bolt 132 is offset 180° from the position of the corresponding bolt locator 34 on member 26. Thus the locating indicia 136 points to a bolt locator 34 which is also 180° offset from the bolt locator used to ultimately align a nut 130 with a bolt 132. Such alignment is controlled by monitoring the output of sensors connected to the optical scanners 46 which sense the rotational movement of the member 26 by scanning slot 36 and the non-reflective surfaces 38 disposed on each side of said slot 36.

The prevailing torque, applied torque, applied turn angle and breakaway torque are monitored by the use of the torsion cell 60 which is connected to a sensor (not shown) and a pair of optical scanners 138 and 140 connected to the gear box 20 by sensor cable 127 (see FIG. 8).

With reference first to FIG. 8, it will be seen that scanners 138 and 140 are disposed along the bottom of gear box 20 and terminate adjacent the outer edge of a disk 142. Said disk 142 is in direct contact with the means which drives socket 98 and has 90 equally-spaced serrations 144 on its periphery. In the preferred embodiment, scanner 138 is positioned at the center or peak of a serration and scanner 140 is positioned at the edge of a serration, i.e. between peaks. With such an arrangement, in an incremental movement of the disk 142 each of the scanners would sense two edges of a combined total of 4. With 90 serrations and 4 sensing values at each serration, a total of 360 sensing values will be made with one complete revolution of the disk 142. This means accurately measures the applied turn angle and, when monitored along with the output of the torsion cell, enables one to accurately determine prevailing torque, applied torque and breakaway torque at the fastener.

Having thus described the invention, what is claimed is:

1. A device for torquing and untorquing visible or hidden nuts on bolts disposed on a common circle of centers on an inner disk hub in the rotor assembly of a jet engine, said device comprising
   (a) a bolt locating platform disposed outside of said rotor assembly,
   (b) a trunnion assembly rotatably disposed within said rotor assembly,
   (c) a connector connecting said bolt locating platform to said trunnion assembly in a predetermined relationship,
   (d) a torquing assembly disposed on said platform and extending into said rotor assembly wherein it passes through said trunnion assembly to a point beyond same,
   (e) a torque box disposed beneath said trunnion assembly, said torque box having one end thereof connected to said torquing assembly,
      (i) a nut socket disposed on the upper side of said torque box at the other end thereof, said nut socket being operably connected by gear means to said torquing assembly,
   (f) a nut inserter assembly for transferring a nut from a point outside of said rotor assembly to a point within said rotor assembly wherein said nut is deposited in the nut socket of said torque box, and
   (g) means for monitoring and measuring bolt torquing and untorquing parameters.

2. The device of claim 1 wherein said bolt locating platform includes a rotatable member and a stationary member, said rotatable member having a first aperture therein for receiving and holding one end of said connector, a second aperture therein for permitting said torquing assembly to pass therethrough and a third aperture therein for permitting vertical movement therethrough of said nut inserter assembly.

3. The device of claim 2 wherein said rotatable member further includes a plurality of bolt locators spaced about the periphery of said rotatable member, said bolt locators having a vertical slot therein which is a reflective surface and non-reflective surfaces on each side of said slot and sensing means disposed on said stationary member for sensing said slot and said non-reflective surfaces, the number of said bolt locators corresponding to the number of bolts within said rotor assembly which are to be torqued or untorqued.

4. The device of claim 3 wherein said sensing means is a plurality of optical scanners for sensing said slots and non-reflective surfaces.

5. The device of claim 1 wherein said trunnion assembly further includes a left support, a right support and means for removably attaching said right support to said left support.

6. The device of claim 5 wherein said right support has a cut-out portion forming a pair of legs which extend outwardly from the center of said right support, each of said legs having a roller depending therefrom and wherein said left support has a U-shaped channel disposed in the outer edge thereof, a plurality of rollers disposed in said U-shaped channel, said rollers of said left support and said right support being in contact with said inner disk hub of said jet engine rotor assembly whereby said trunnion assembly is rotatable on said disk hub.

7. The device of claim 1 wherein said torquing assembly includes a housing disposed on said bolt locating platform, a hollow counter-torque shaft having the outer end thereof disposed for rotational and vertical movement in said housing and the inner end thereof affixed to said torque box, means associated with the outer end of said counter-torque shaft for applying a torque thereto, a torque shaft rotatably disposed within said counter-torque shaft, means associated with the outer end of said torque shaft for applying a torque thereto, and means associated with the inner end of said torque shaft for transmitting torque applied thereto to said gear means of said torque box.

8. The device of claim 7 wherein said monitoring and measuring means comprises means for monitoring and measuring rotational movement of said torque shaft and means for monitoring and measuring rotational movement of said nut socket.

9. The device of claim 8 wherein said means for monitoring and measuring the rotational movement of said torque shaft is a torsion cell operably connected to said torque shaft.

10. The device of claim 8 wherein said means for monitoring and measuring the rotational movement of said nut socket includes a disk having a plurality of equally spaced serrations disposed about its circumference, said disk being operably connected to and rotatable with said nut socket and a pair of optical scanners disposed for sensing the rotational movement of said disk whereby one of said scanners senses the peak of a serration and the other senses the edge of a serration.

11. The device of claim 1 wherein said nut inserter assembly includes a mounting frame disposed on the bolt locating platform, a shaft, means disposed on said mounting frame for supporting said shaft for rotary and vertical movement, a nut loading/unloading arm affixed to said shaft adjacent its inner end and extending perpendicularly outward therefrom, and nut positioning means associated with the upper end of said shaft and said mounting frame.

12. The device of claim 11 wherein said nut loading/unloading arm comprises a flat plate having an end portion of reduced thickness, a crescent-shaped cutout located in said end portion and a spring clip affixed to the upper side of said arm and extending outwardly over said end portion of reduced thickness.

* * * * *